US006316148B1

(12) United States Patent
Timmons et al.

(10) Patent No.: US 6,316,148 B1
(45) Date of Patent: Nov. 13, 2001

(54) FOIL-ENCAPSULATED, LIGHTWEIGHT, HIGH ENERGY ELECTRODES FOR LEAD-ACID BATTERIES

(75) Inventors: John B. Timmons, Winston-Salem, NC (US); Ramesh Bhardwaj, Walnut; Joseph A. Orsino, San Clemente, both of CA (US)

(73) Assignee: Condord Battery Corporation, West Covina, CA (US)

( * ) Notice: Subject to any disclaimer, the term of this patent is extended or adjusted under 35 U.S.C. 154(b) by 0 days.

(21) Appl. No.: 09/653,099

(22) Filed: Aug. 31, 2000

(51) Int. Cl.[7] ............................................. H01M 4/74
(52) U.S. Cl. ..................... 429/241; 429/204; 429/211; 429/225; 429/226; 429/228; 429/340; 29/2
(58) Field of Search ................................ 429/204, 211, 429/225, 226, 228, 340; 29/2

(56) References Cited

U.S. PATENT DOCUMENTS

| Re. 33,133 | 12/1989 | Kiessling | 429/242 |
|---|---|---|---|
| 4,554,228 | 11/1985 | Kiessling | 429/242 |
| 4,717,633 | * 1/1988 | Hauser et al. | 429/209 |
| 4,760,001 | 7/1988 | Nann et al. | 429/136 |
| 5,045,086 | 9/1991 | Juergens | 29/623.1 |
| 5,047,300 | 9/1991 | Juergens | 429/94 |
| 5,198,313 | 3/1993 | Juergens | 429/94 |
| 5,334,464 | * 8/1994 | Rowlette | 429/210 |
| 5,368,961 | 11/1994 | Juergens | 429/233 |
| 5,677,078 | 10/1997 | Juergens et al. | 429/94 |
| 5,820,639 | 10/1998 | Snyder et al. | 29/623.5 |
| 5,895,728 | 4/1999 | Walker et al. | 429/53 |
| 5,973,478 | 10/1999 | Keating et al. | 320/125 |

OTHER PUBLICATIONS

"Conducting Polymer Blends as Inert Electrodes"; AMP Journal of Technology, vol. 1, Nov. 1991; J.L. Joyce, Jr. et al.

"A New Anisotripic Conductive Film with Arrayed Conductive Particles", AMP Journal of Technology, vol. 5, Jun. 1996; K. Isibashi and J. Kimura.

* cited by examiner

*Primary Examiner*—Carol Chaney
*Assistant Examiner*—Dah-Wei Yuan
(74) *Attorney, Agent, or Firm*—Womble Carlyle Sanderle Rice PLLC; C. Robert Rhodes

(57) ABSTRACT

A lightweight, high-energy electrode plate for a lead acid battery, and method for making an electrode plate, comprising a highly conductive non-lead substrate having a specific gravity no greater than 70% that of lead, a pair of outer layers of thin sheets of imperforate conductive foil that is corrosive resistant to the electrolyte acids of the battery and that are welded together to encapsulate the non-lead substrate.

30 Claims, 4 Drawing Sheets

FOIL-ENCAPSULATED, LIGHTWEIGHT, HIGH ENERGY ELECTRODES FOR LEAD-ACID BATTERIES

FIELD OF THE INVENTION

The present invention is directed to lead-acid batteries, and particularly to lightweight, high energy batteries formed with electrodes having a highly conductive non-lead perforate substrate encapsulated between thin, non-corrosive, conductive outer foil layers of lead, lead/tin alloys, or other lead alloys.

BACKGROUND OF THE INVENTION

Lead-acid batteries conventionally include a multiplicity of cells connected together in series. Each cell consists of a stack of alternating electrodes, namely cathodes and anodes. Often there is a layer of insulation or separator between the electrodes. The separators are saturated, the cells are flooded, or provide in some other manner with an electrolyte (generally sulfuric acid).

In the past, the electrodes have been formed primarily of lead castings, stampings, or an expended mesh of lead or lead compound which provides the structural element to support the active material (lead or lead alloy) of the electrode. When charged, the electrodes become positively or negatively charged, where the energy is stored until used in whatever application the battery is put. The battery may also be recharged from time to time.

Lead has been predominately used in such batteries for a long period of time. While lead is not particularly a good conductor of electricity, it is inherently corrosive resistant to the electrolytic acids flooding the battery case. Other, more conductive metals are either too expensive to be used as the electrodes for lead-acid batteries, or else they are quickly corroded during the charging action by the electrolytic acids. Therefore, lead has remained as the predominant material. However, lead is also very heavy, and in applications where weight is a factor, other alternatives have long been sought.

For example, in the aircraft industry, experts have calculated that the fuel cost of flying a commercial airliner is more than $3,000 per year per pound of weight flown. Therefore, as opposed to batteries having lead plates, considerable sums of money could be saved per plane if a lighter weight electrode material could be found.

In previous attempts, one approach has been to plate lead onto other more conductive metals or metal alloys such as aluminum and copper. For example, copper is sixteen times as conductive as lead and weighs only about 70% as much. Aluminum, on the other hand, has a specific gravity of only 20%–25% of lead and has approximately eight times the conductivity of lead. Obviously, from the standpoint of weight and conductivity, copper and aluminum are good candidates to replace lead as the substrate for electrodes. However both materials are very susceptible to corrosion in the presence of sulfuric acid, and cannot be used as the positive or current collecting electrode in a lead acid battery if left unprotected. Either material can be used as the negative electrode, and copper has in the past been typically chosen. Previous attempts to use aluminum or copper as the structural element for the positive electrodes of a lead acid battery have been directed to plating lead coatings onto aluminum or copper substrates. The conventional manner for plating lead is from an aqueous solution. The problem arises that when lead is plated from an aqueous solution, for one reason or another, the coatings are porous, and the sulfuric acid will quickly penetrate the coatings and attack the aluminum or copper. In such instances, the copper and aluminum plates have not survived the charging operation.

SUMMARY OF THE INVENTION

The present invention is directed toward reducing the weight per unit mass of the battery by replacing the structural lead or lead alloy plates of at least the current collecting electrode of the battery with a lighter weight, conductive material that is encapsulated between outer layers of lead, lead alloy, or some other conductive coating that is resistant to the electrolytic acid. Toward this end, then, the present invention utilizes a highly conductive non-lead substrate as the structural material and current collector for lead-acid battery electrodes. This substrate is significantly lighter than lead, having a specific gravity of no greater than 70% that of lead. The non-lead substrate may be aluminum, aluminum alloys, aluminum/magnesium alloys, copper, copper alloys, nickel, nickel alloys or non-metallic materials such as graphite, carbon fibers and conductive plastics. The substrate is preferably formed as a perforated plate or foil, however may also be a wire mesh, or multiple fibers or strips of conductive wire. Each of these substrate constructions has substantial open spaces around and between the structural material, permitting the outer layers of encapsulating material to weld together through the open spaces and around the side and/or end edges of the substrate.

The substrate of non-lead perforated structural material is encapsulated between imperforate outer layers of conductive foil that is corrosive resistant to the electrolytic acid to be used in the battery. The corrosive resistant protective outer layers may be formed from such materials as lead, lead/tin alloys, and other lead alloys and conductive epoxies. Intermediate protective layers of nickel, copper, silver, gold, or titanium may also be added. The result is a continuous outer cover that is substantially non-porous and protects the lighter weight conductive substrate. Further, the energy to weight ratio, when compared to conventional lead plate cells, is 17% to 67% greater. That is to say, rather than an energy to weight ratio of approximately 30 Watt-hours/kilogram (WH/kg) typical of conventional lead plate lead-acid batteries, the energy to weight ratio of batteries of the present invention may be in the range of about 35–50 WH/kg.

DESCRIPTION OF THE PREFERRED EMBODIMENTS

Figure 1:
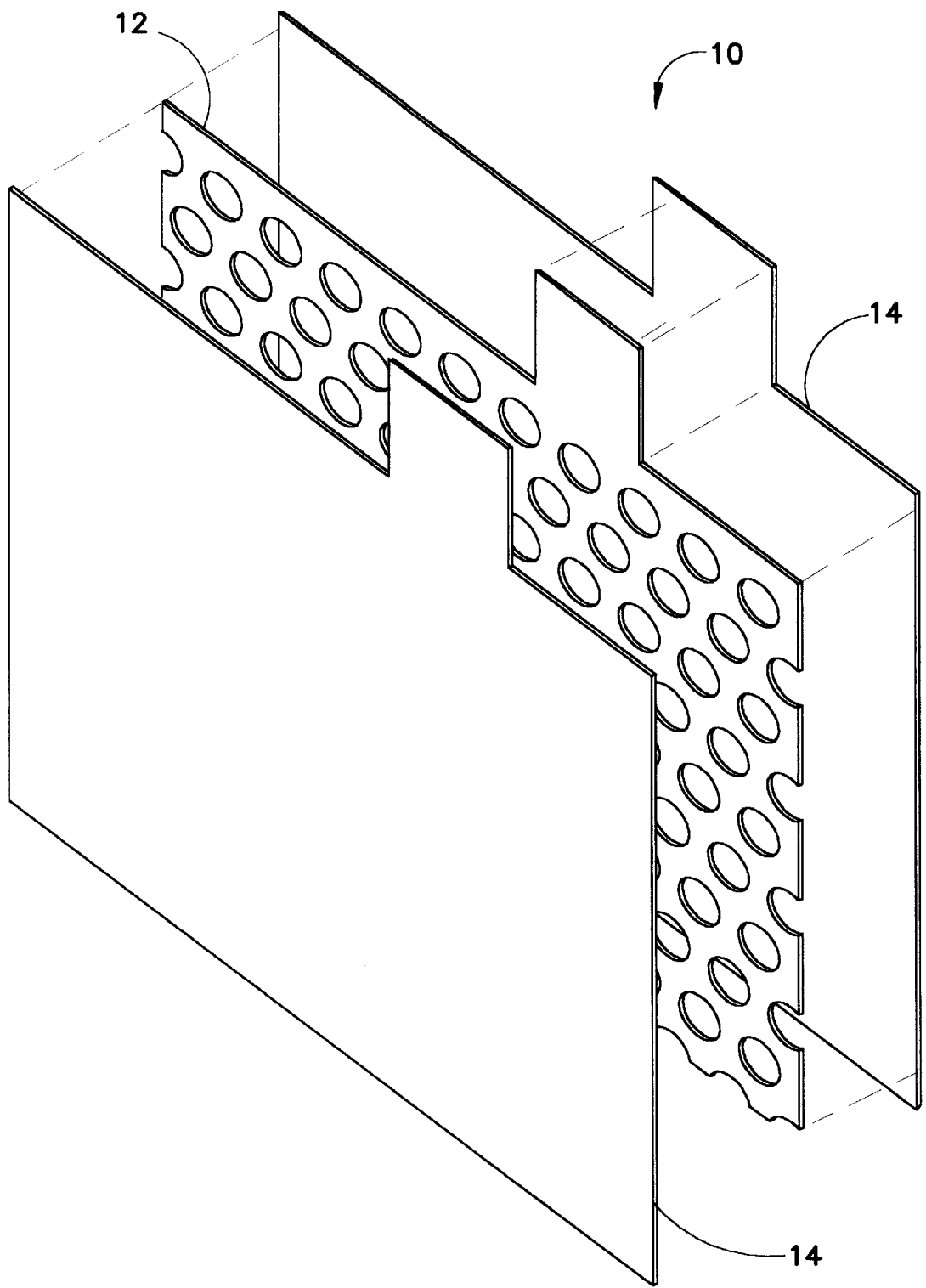
FIG. 1 is a perspective exploded view of a lightweight, high-energy electrode for a lead-acid battery constructed according to the present invention.

Referring now to FIG. 1, there is illustrated an electrode construction, particularly for current collecting electrodes, shown generally as 10 for a lightweight, high-energy lead-acid battery. Electrode 10 is constructed with a substrate 12 that serves as both a structural element and current collector, and a pair of outer layers 14 of corrosive resistant material. The electrode 10 is constructed in such a manner to be at least 30% lighter than conventional lead plate electrodes.

Accordingly, the lightweight, highly conductive substrate 12 is in a cast or rolled strip form which is punched or expanded into a structural element with openings throughout its surface area to allow the subsequent application of outer layers 14. Toward this end, substrate 12 is formed from materials such as aluminum, aluminum alloys, aluminum/magnesium alloys, copper, copper alloys, graphite, carbon fibers, and conductive plastics. Substrate 12 is perforated and for a thickness between about 0.0005 inches and 0.300 inches (0.12 mm–7.62 mm). Preferably the substrate is between about 0.001" and 0.020" thick. However, substrate 12 may be formed as a woven wire mesh, or as a plurality of conductive wires.

Figure 2:
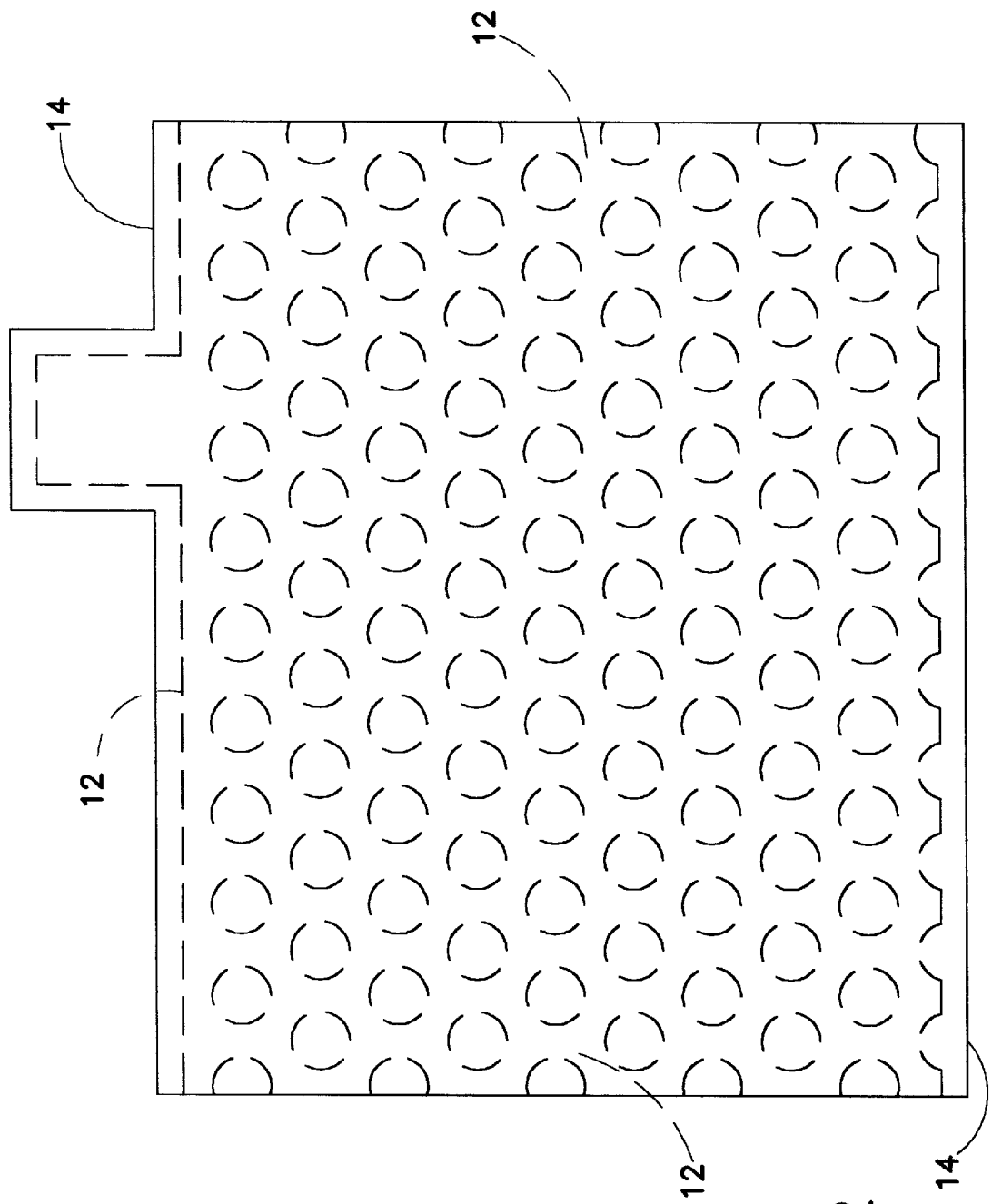
FIG. 2 is a front view of the electrode of FIG. 1.

Substrate 12 is encapsulated between a pair of outer layers 14 of lead or lead alloy foil as corrosion protection for substrate 12. As best seen in FIG. 2, the outer layers 14 are of such dimension that the upper and lower edges thereof overlap the corresponding edges of the substrate 12, leaving a margin which may be welded together. In valve regulated lead acid batteries there is no free electrolyte, and therefore the side edges are not necessarily sealed. However in flooded lead acid batteries, all four edges of the foil layers 14 should extend beyond the corresponding edges of the substrate 12 to seal the edges. Substrate 12 is encapsulated by subjecting the outer layers 14 to pressure, heat, heat and pressure, an electric current, ultrasonic welding or a combination of these processes in order to melt the opposing outer surfaces of layers 14 and weld them into a sheet. The weld is continuous along the outer edges and extends through the perforations or open spaces within the substrate 12. The outer layers are between about 0.0005 inches and 0.030 inches (0.12 mm–0.76 mm) in thickness. Preferably the outer layers are about 0.005" thick.

If desired, in order to better protect the lightweight, highly conductive electrode, prior to encapsulation an intermediate protective layer (not shown) of nickel, copper, silver, gold, or titanium foil may first be applied to substrate 12 by mechanical application (welding) or by plating (electrochemically or electroless) beneath the outer layers 14.

In an alternate embodiment, the intermediate layer may also be a layer of lead foil with a lead/tin alloy outer layer. This provides excess tin during the charging cycle which plates the surface and precludes the "antimony free" effect.

The resulting electrode realizes an energy to weight ratio in the range of about 35 to 50 Watt-hours/kilogram (WH/kg), compared with conventional electrodes which realize an energy to weight ratio of about 30 WH/kg. For purposes of comparison, the specific gravities and resistivities of the relevant materials are as follows:

|    | MATERIAL  | SPECIFIC GRAVITIES | RESISTIVITY IN (U-OHMS) |
|----|-----------|--------------------|-------------------------|
| a. | lead      | 11.35              | 22                      |
| b. | aluminum  | 2.7                | 2.82                    |
| c. | copper    | 8.9                | 1.72                    |
| d. | magnesium | 1.74               | 0.80                    |

Figure 3:
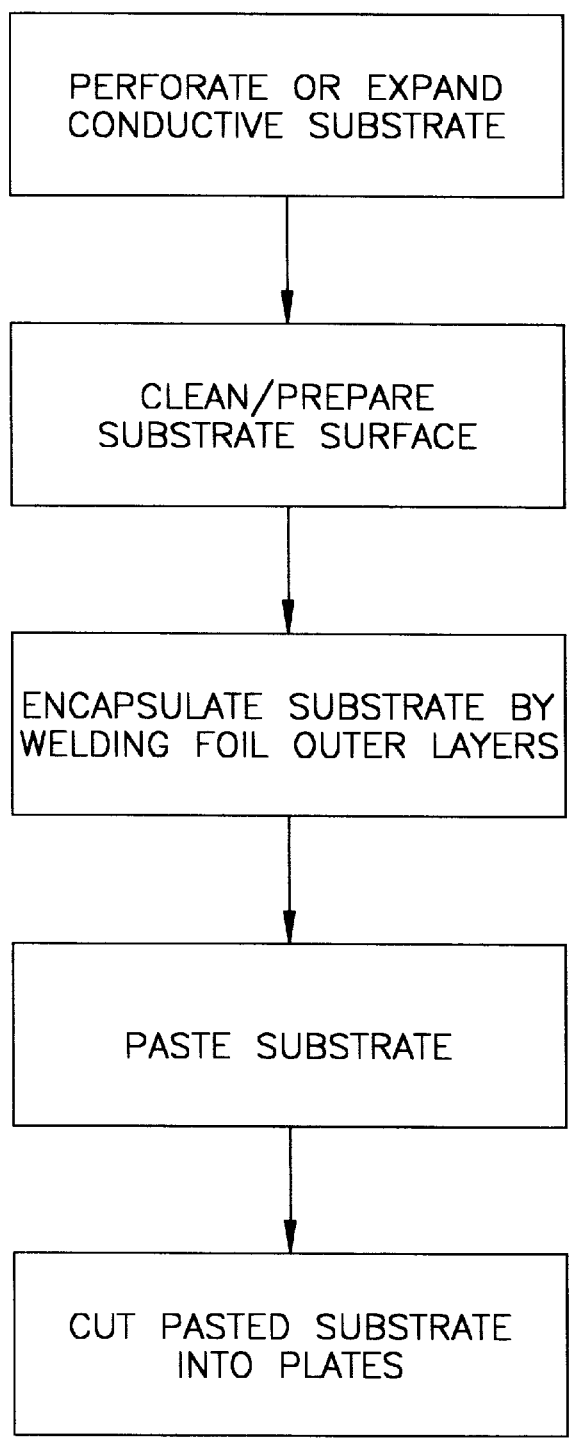
FIG. 3 is a flow chart illustrating a method of forming the electrode of FIG. 1.

Turning now to FIG. 3, there is illustrated in general, a method for forming lightweight, high-energy electrodes for lead-acid batteries. First, a lightweight conductive alloy in cast or roll strip form is punched or expanded into a structural substrate with spaces or openings throughout that allow the outer layers to be bonded to each other, thereby imparting a structural integrity and strength to the encapsulated composite electrode. The surfaces of the structural, conductive substrate are cleaned by sand or bead blasting or chemical cleaning. This is followed by rinsing and de-greasing using water or solvents to remove any non-conductive or insulating layers of oxide or other chemical compounds that will restrict the movement of electrons from the active mass to the substrate. If a protective layer is to be applied, this is the next step.

The substrate is next encapsulated by placing the substrate between corrosion resistant layers of lead or lead alloy foil. The outer layers of the foil overlap the outer edges of the substrate, as best seen in FIG. 2, leaving a border which is sealed to prevent the intrusion of the electrolyte of the battery into the substrate core. The layered structure is then subjected to pressure, heat, heat and pressure, an electric current, or a combination of these processes in order to melt and fuse or weld the opposing surfaces into a sheet. The weld is continuous along the outer edges and through the perforations in the substrate.

The outer layers may be welded together by conventional techniques known in the art such as the application of pressure alone, the application of heat alone, or the application of a combination of heat and pressure. Since the melting point of lead (327° C.) is significantly lower than the melting point of aluminum (660° C.), a wide range of temperatures and pressure may be used to satisfactorily achieve this result. Further, cold rolling or extrusion of the outer and inner layers is also an effective means of completely encapsulating the substrate.

Figure 4:
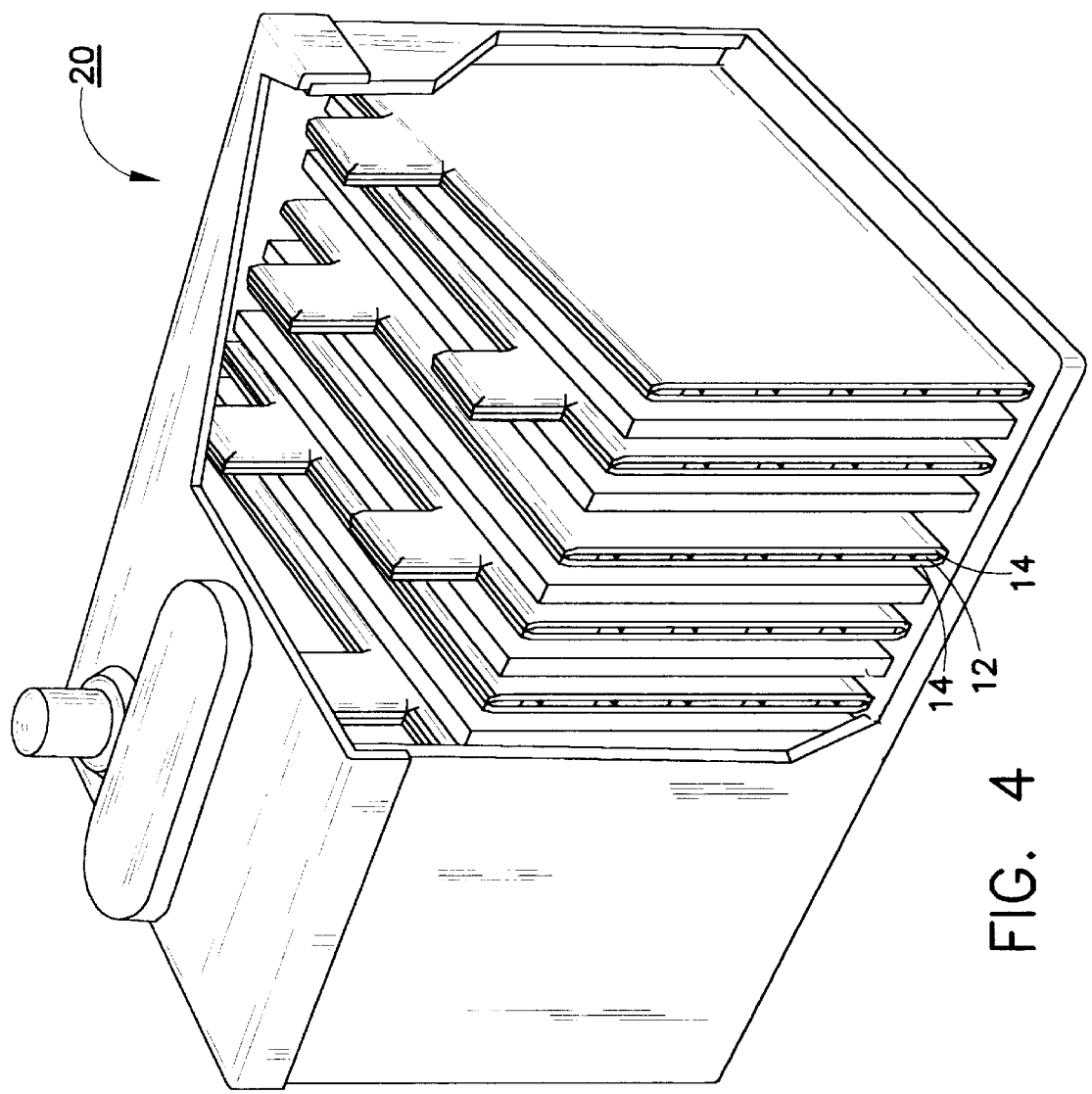
FIG. 4 is a perspective view of a lead-acid battery containing a plurality of the lightweight electrodes of FIGS. 1 and 2.

The method of forming the lightweight, high-energy lead-acid battery electrodes may include the further steps of pasting the electrode construction described hereinabove and cutting the electrode into individual electrode plates. Specifically, a layer of active material (not shown) may be pasted over the outer layers of the electrode. The active material is selected from the group consisting of lead oxide, lead sulfate, or a mixture of lead oxide and lead sulfate. Desirably, the active material is applied to a thickness of between about 0.003 inches to 0.050 inches. Because of the lightweight construction of the composite electrode, the electrodes are pasted by spraying, dipping in a slurry, or by conventional belt or orifice pasting machinery common to the lead-acid battery industry. The pasted strip may then be cut into individual electrode plates of desired length for the particular battery application and construction (shown generally as 20 in FIG. 4).

Certain modifications and improvements will occur to those skilled in the art upon a reading of the foregoing description. It should be understood that all such modifications and improvements, while not discussed in detail hereinabove, are properly within the scope of the following claims.

We claim:

1. Lightweight, high-energy electrode plates for lead-acid batteries comprising:

a) a highly conductive, non-lead, perforated substrate having a specific gravity no greater than 70% that of lead, wherein said non-lead substrate is selected from the group of materials consisting of aluminum, aluminum alloys, aluminum/magnesium alloys, copper, copper alloys, graphite, carbon fibers, and conductive plastics; and b) a pair of outer layers of conductive material, each layer on an opposite side of said substrate that are corrosive resistant to the electrolytic acids of the battery, said outer layers comprised of imperforate sheets of foil bonded together and substantially encapsulating the non-lead substrate, said outer layers between about 0.0005 inches and 0.030 inches thick and selected from the group consisting of lead, lead/tin alloys, and lead alloys.

2. The electrode plate according to claim 1 wherein said perforated substrate is between about 0.0005 inches and 0.030 inches thick.

3. The electrode plate according to claim 1 wherein said substrate is between about 0.001 inches and 0.020 inches thick and each foil layer is about 0.005 inches thick.

4. The electrode plate according to claim 1 wherein said non-lead substrate is formed as a woven wire mesh.

5. The electrode plate according to claim 1 wherein said non-lead substrate is formed from a plurality of conductive wires.

6. The electrode plate according to claim 1 further including a paste layer of active material between about 0.003 inches and 0.050 inches thick on said outer layer of conductive material, wherein said active material is selected from the group consisting of lead oxide, lead sulfate, and a mixture of lead oxide and lead sulfate.

7. The electrode plate according to claim 1 and further including an intermediate protective layer of foil between each outer layer and said substrate, said intermediate layer of foil selected from the group consisting of nickel, copper, gold, silver and titanium.

8. The electrode plate according to claim 1 and further including an intermediate layer plated to said substrate, said intermediate layer being selected from the group consisting of nickel, copper, gold, silver, and titanium.

9. The electrode plate according to claim 1 wherein said outer layers are lead/tin alloy foil and further comprising an intermediate layer of lead foil between each outer layer and said substrate.

10. A lead-acid battery of the type having a plurality of alternating electrodes housed in a compartment containing electrolyte, wherein at least the current collecting electrodes are formed of plates comprising:
   a) a highly conductive non-lead perforate substrate selected from the group consisting of aluminum, aluminum alloys, aluminum/magnesium alloy, copper, copper alloys, graphite, carbon fibers, and conductive plastics;
   b) a pair of outer layers of imperforate conductive foil, each layer on an opposite side of said substrate, said outer layers being corrosive resistant to electrolytic acids and selected from the group consisting of lead, lead/tin alloys, and lead alloys; and
   c) wherein said outer layers are welded together to encapsulate said non-lead substrate.

11. The electrode plate according to claim 10 wherein said perforated substrate is between about 0.0005 inches and 0.030 inches thick.

12. The electrode plate according to claim 10 wherein said substrate is between about 0.001 inches and 0.020 inches thick and each foil layer is about 0.005 inches thick.

13. The electrode plate according to claim 10 wherein said non-lead substrate is formed as a woven wire mesh.

14. The electrode plate according to claim 10 wherein said non-lead substrate is formed from a plurality of conductive wires.

15. The electrode plate according to claim 10 further including a paste layer of active material between about 0.003 inches and 0.050 inches thick on said outer layer of conductive material, wherein said active material is selected from the group consisting of lead oxide, lead sulfate, and a mixture of lead oxide and lead sulfate.

16. The electrode plate according to claim 10 and further including an intermediate protective layer of foil between each outer layer and said substrate, said intermediate layer of foil selected from the group consisting of nickel, copper, gold, silver and titanium.

17. The electrode plate according to claim 10 and further including an intermediate layer plated to said substrate, said intermediate layer being selected from the group consisting of nickel, copper, gold, silver, and titanium.

18. The electrode plate according to claim 10 wherein said outer layers are lead/tin alloy foil and further comprising an intermediate layer of lead foil between each outer layer and said substrate.

19. A method for making lightweight, high-energy electrode plates for lead-acid batteries comprising the steps of:
   a. cleaning and preparing substrates formed of a conductive, non-lead material having a specific gravity no greater than 70% that of lead, wherein said substrates are selected from the group of materials consisting of aluminum, aluminum alloys, aluminum/magnesium alloys, copper, copper alloys, graphite, carbon fibers, and conductive plastic;
   b. encapsulating the non-lead substrate between conductive outer layers of corrosive resistant imperforate foil, wherein said conductive outer layers are selected from the group consisting of lead, lead/tin alloys, and lead alloys; and
   c. welding said outer layers together to encapsulate said non-lead substrate.

20. The method according to claim 8 wherein the welding of said outer layers is performed by selecting from the group of process steps consisting of subjecting said outer layers to pressure, subjecting said outer layers to heat, subjecting said outer layers to pressure and heat, and subjecting said outer layers to electric current.

21. The method of claim 8 further including the step of pasting an active material on said outer layers welded to said non-lead substrate, said active material selected from the group consisting of lead oxide, lead sulfate, and a mixture of lead oxide and lead sulfate.

22. The method of claim 10 further including the step of cutting said pasted outer layers welded to said non-lead substrate into individual electrode plates.

23. The electrode plate according to claim 1 wherein said outer layers extend above the upper edge of said substrate and below the lower edge of said substrate, providing upper and lower margins where said bond occurs.

24. The electrode plate according to claim 1 wherein said outer layers extend past the upper edge, the lower edge, and each side edge of said substrate providing an upper, lower, and side margin where said bond occurs.

25. The electrode plate according to claim 1 wherein said outer layers of foil are welded together.

26. The electrode plate according to claim 1 wherein said outer layers of foil are fused together.

27. The lead acid battery according to claim 10 wherein said battery is a valve regulated lead acid battery and wherein said outer layers extend above the upper edge of said substrate and below the lower edge of said substrate, providing an upper and lower margin where said bond occurs.

28. The lead acid battery according to claim 10 wherein said battery is a flooded lead acid battery and wherein said outer layers extend past the upper edge, the lower edge, and each side edge of said substrate providing an upper, lower, and side margin where said bond occurs.

29. The battery according to claim 10 wherein said layers of foil are welded together.

30. The battery according to claim 10 wherein said layers of foil are fused together.

* * * * *

UNITED STATES PATENT AND TRADEMARK OFFICE
CERTIFICATE OF CORRECTION

| | |
|---|---|
| PATENT NO. | : 6,316,148 B1 |
| DATED | : November 13, 2001 |
| INVENTOR(S) | : John B. Timmons, Ramesh Bhardwaj, and Joseph Orsino |

It is certified that error appears in the above-identified patent and that said Letters Patent is hereby corrected as shown below:

<u>Column 5,</u>
Line 34, the words "of the type" should be deleted.

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,316,148 B1
DATED         : November 13, 2001
INVENTOR(S)   : John B. Timmons, Ramesh Bhardwaj and Joseph Orsino It is certified that error appears in the above-identified patent and that said Letters Patent is hereby corrected as shown below:

Title page,
Item [73], Assignee, "Condord Battery Corporation" should read -- Concord Battery Corporation --.

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,316,148 B1
DATED         : November 13, 2001
INVENTOR(S)   : John B. Timmons, Ramesh Bhardwaj and Joseph Orsino It is certified that error appears in the above-identified patent and that said Letters Patent is hereby corrected as shown below:

Title page,
Item [73], Assignee, "Condord Battery Corporation" should read -- Concorde Battery Corporation --.

This certificate supersedes Certificate of Correction issued July 13, 2004.

Signed and Sealed this

Thirty-first Day of August, 2004

JON W. DUDAS
*Acting Director of the United States Patent and Trademark Office*